US008790065B2

(12) United States Patent
Worth, II et al.

(10) Patent No.: US 8,790,065 B2

(45) Date of Patent: Jul. 29, 2014

(54) CONVERTIBLE MAIL CONTAINER AND METHOD

(75) Inventors: Floyd W. Worth, II, Richardson, TX (US); Michael O. Norris, Colleyville, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 209 days.

(21) Appl. No.: 13/356,019

(22) Filed: Jan. 23, 2012

(65) Prior Publication Data

US 2013/0189070 A1 Jul. 25, 2013

(51) Int. Cl.
*B65G 65/00* (2006.01)

(52) U.S. Cl.
USPC ............................ 414/810; 414/421; 414/414

(58) Field of Classification Search
USPC ............... 206/216, 459.5; 220/315, 529, 610, 220/810–814, 816, 825, 831, 833; 312/138.1, 139.1; 49/258, 260; 53/382.1
See application file for complete search history.

(56) References Cited

U.S. PATENT DOCUMENTS

| | | | | |
|---|---|---|---|---|
| 871,877 | A * | 11/1907 | Lyons | 312/139.1 |
| 1,529,601 | A * | 3/1925 | Lyons | 49/197 |
| 3,398,485 | A * | 8/1968 | Stokes | 49/202 |
| 3,717,270 | A * | 2/1973 | Rooke et al. | 414/414 |
| 4,600,254 | A * | 7/1986 | Whalen | 312/323 |
| 5,906,468 | A * | 5/1999 | Vander Syde et al. | 414/403 |
| 5,993,132 | A * | 11/1999 | Harres et al. | 414/416.04 |
| 6,012,891 | A * | 1/2000 | Timmins | 414/421 |
| 6,622,345 | B2 * | 9/2003 | Liu et al. | 16/357 |
| 6,695,165 | B2 * | 2/2004 | Park | 220/812 |
| 2006/0011686 | A1 * | 1/2006 | Latham | 224/579 |
| 2006/0180434 | A1 * | 8/2006 | Arnold et al. | 198/463.3 |
| 2010/0193393 | A1 * | 8/2010 | Humm et al. | 206/503 |

* cited by examiner

*Primary Examiner* — Gregory Adams

(57) ABSTRACT

A convertible mail container and related method. The convertible mail container includes a bottom, two fixed side walls connected to the bottom, and a fixed end wall connected to the side walls and to the bottom. The convertible mail container also includes a movable wall that is movable from a first position where the movable wall forms a second end wall of the convertible mail container, opposite the fixed end wall, to a second position where the movable wall is adjacent to the two fixed side walls and the fixed end wall so that it covers a portion of a top opening of the convertible mail container.

5 Claims, 4 Drawing Sheets

CONVERTIBLE MAIL CONTAINER AND METHOD

TECHNICAL FIELD

The present disclosure is directed, in general, to processing of mail, including flats and other mail pieces or parcels.

BACKGROUND OF THE DISCLOSURE

Improved systems for the handling and transport of mail pieces is desirable.

SUMMARY OF THE DISCLOSURE

Various disclosed embodiments include a convertible mail container. The convertible mail container includes a bottom, two fixed side walls connected to the bottom, and a fixed end wall connected to the side walls and to the bottom. The convertible mail container also includes a movable wall that is movable from a first position where the movable wall forms a second end wall of the convertible mail container, opposite the fixed end wall, to a second position where the movable wall is adjacent to the two fixed side walls and the fixed end wall so that it covers a portion of a top opening of the convertible mail container. The movable wall acts as a wall of the convertible mail container when the convertible mail container is in a first configuration where the movable wall is in the first position and the convertible mail container is in a horizontal orientation, and also when the convertible mail container is in a second configuration where the movable wall is in the second position and the convertible mail container is in a vertical orientation.

Another disclosed embodiment includes a method of transporting mail items. The method includes using a convertible mail container in a horizontal configuration as an output tray of a mail processing machine and receiving a plurality of items in the convertible mail container in a horizontal stack. The method includes reconfiguring the convertible mail container to a vertical configuration, including moving a wall of the convertible mail container, so that the plurality of items is moved to a vertical orientation. The method includes extracting the plurality of items while the convertible mail container is in the vertical configuration.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Figure 1:
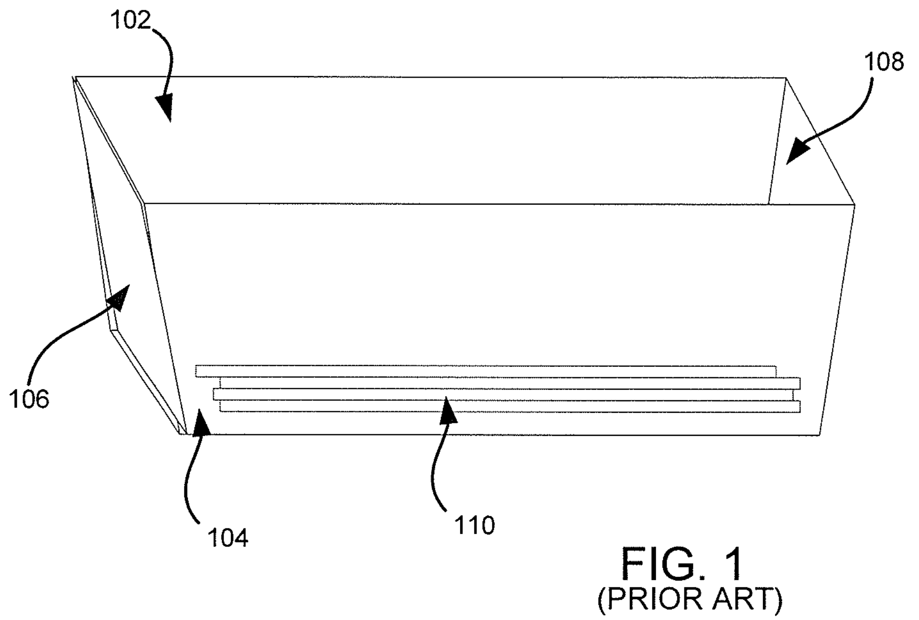
FIG. 1 (PRIOR ART)
FIG. 1 depicts a typical container that receives the items output from a mail sequencer, sorter, or similar machine.

Typically in the process of sorting or sequencing flats, large envelopes, small packages, and other mail pieces, the output of that process is a container composed of horizontally or semi-horizontal stacked items. FIG. 1 depicts a typical container, also referred to as a tray or bin, that receives the items output from a mail sequencer, sorter, or similar machine. The container is a basic open-top container having a bottom (not visible in this example), side walls 102 and 104, and end walls 106 and 108. While the relative and absolute dimensions may differ, the side walls and end walls are immobile, and the items 110 are deposited in the container so that they lie horizontally. Items 110 can be any mail pieces, flats, letters, or parcels.

In the case of sequenced items, when an item is to be extracted from the container by a person, the person is required to reach inside the container to secure the item, grasp the item, and partially remove the items to examine the item to determine if the item underneath should also be removed. This process is extremely time consuming.

However, if the items are vertically slacked, a person can "finger" or "flip through" the items, make a determination as to how many items are to be removed, and remove all of the items with one handful. This process significantly reduces the time required to extract items from the container.

This problem can be manually addressed by removing all of the items from the container, repositioning all of the items from a horizontal position to a vertical position and placing them in another container designed for vertical extraction. This is either done by a person manually or by automation, but either case requires an extra process to transfer the items from the horizontal tray from the output of a sequencer into a second tray that allows the items to be vertically handled and extracted.

Disclosed embodiments include a container that can be converted from a horizontal container to a vertical container quickly, significantly reducing the expense and time required to reorient the mail items to a vertical position.

Figure 2:
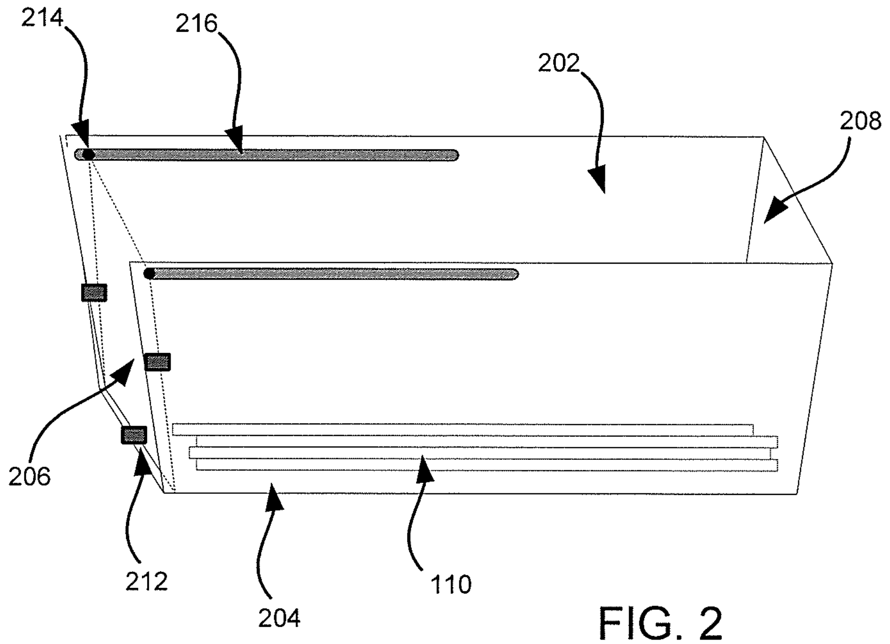
FIGS. 2-4 depict an example of a convertible container in accordance with disclosed embodiments.

FIG. 2 depicts an example of a convertible container in accordance with disclosed embodiments, shown in a horizontal configuration with end wall 206 in a first position. In this figure, fixed side walls 202 and 204 and fixed end wall 208 are structurally similar to that of the container in FIG. 1, and are each connected to the bottom 220 of the convertible container. Bottom 220 is not visible in this figure, but is visible in FIG. 3. However, end wall 206 is not permanently attached to side walls 202 and 204. Instead, movable end wall 206 is movable from the first position as shown in FIG. 2, where it is opposite the fixed end wall 208 and acts as an end wall in a horizontal container position, to a second position as described below, where it covers a portion of the open "top" side, and so acts as a side wall in a vertical container position.

This figure and other figures herein are not drawn to any particular scale, and the dimensions of the disclosed containers may differ for particular implementations.

In this embodiment, end wall 206 can be locked in the first position using one or more fasteners 212. Fasteners 212 can be attached between end wall 206 and the bottom of the container, side wall 202, or side wall 204. Fasteners 212 can be buckles, clips, snaps, hook-and-loop, or any other fastener capable of holding end wall 206 in place in the first position, or can be a locking structure of end wall 206 itself.

In this embodiment, a pivot end of the end wall 206 is rotatably and slidably attached to sidewall 202 and sidewall 204 by fasteners 214. Fasteners 214 can be rivets, screws, a bar, or another structure that connects the pivot end of end wall 206 to side walls 202 and 204 so that end wall 206 can rotate to the top side of the container and slide toward the other end wall into the second position described below.

In this embodiment, fasteners 214 travel in slots 216 of side walls 202 and 204. When in the first position, as shown, the pivot end of end wall 206 is at the first end of the slots 216. Fasteners 214 can be implemented as a slidable hinge that allows the end wall 206 to rotate about the hinge at the pivot end, and also allows the hinge to slide along the length of the slots 216.

In a first configuration as shown in FIG. 2, with a horizontal orientation and the end wall 206 in the first position, the convertible container can be used as the conventional container shown in FIG. 1, and can be used as the output container or a mail sequencer, mail sorter, or other mail processing machine, and can receive and transport items 110 in the horizontal orientation.

Figure 3:
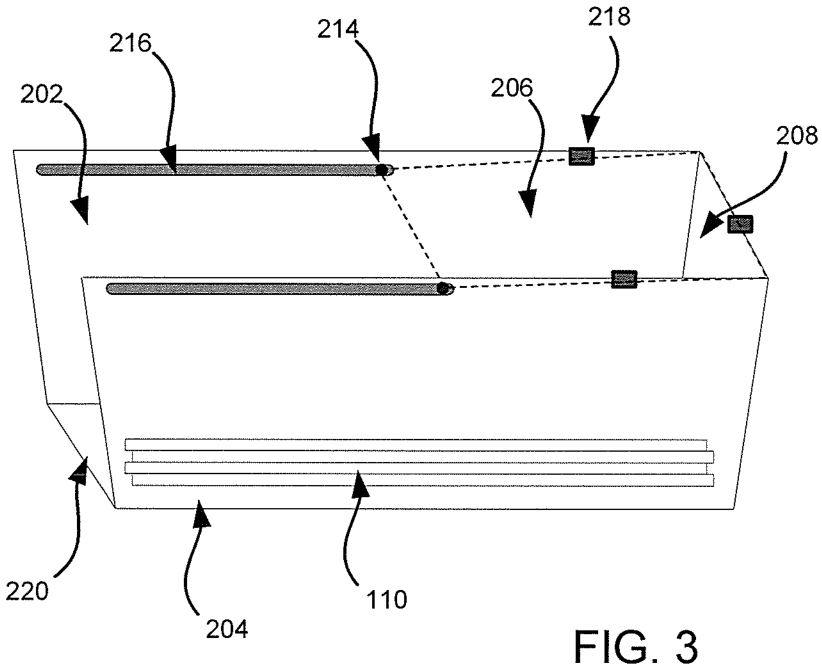

FIG. 3 depicts an example of the convertible container in accordance with disclosed embodiments, as in FIG. 2, shown in a horizontal configuration with end wall 206 in the second position. In this figure, end wall 206 has been rotated about fasteners 214 and slid along slots 216 into the second position, where it covers a portion of the open "top" side, and so can act as a side wall in a vertical container position. In the second position, the movable end wall 206 is adjacent to side walls 202 and 204 and to end wall 208.

In this figure, end wall 206 can be locked in the second position using one or more fasteners 218. Fasteners 218 can be attached between end wall 206 and the end wall 208, side wall 202, or side wall 204. Fasteners 218 can be buckles, clips, snaps, hook-and-loop, or any other fastener capable of holding end wall 206 in place in the second position, or can be a locking structure of end wall 206 itself.

When in the second position, as shown, the pivot end of end wall 206 is at the second end of the slots 216. The left side of the container, viewed in the perspective of FIG. 3, is now open, and the end wall 206 covers a portion of the right side of the top of the horizontal container.

A worker or machine can move the end wall 206 from the first position as shown in FIG. 2 to the second position as shown in FIG. 3. When in the second position, the container can then be moved from a horizontal orientation to a vertical orientation. The movable end wall 206 acts as a wall of the convertible mail container when the movable wall is in the first position and the convertible mail container is in a horizontal orientation, and also when the movable wall is in the second position and the convertible mail container is in a vertical orientation.

Figure 4:
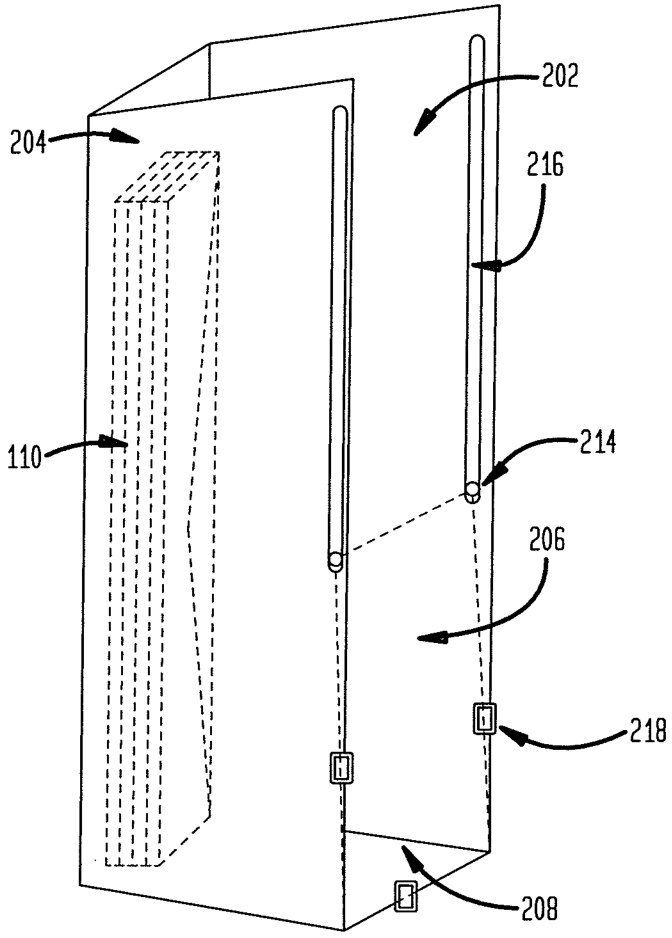

FIG. 4 depicts an example of the convertible container in accordance with disclosed embodiments, as in FIG. 3, shown in a vertical configuration with end wall 206 in the second position.

In the vertical orientation, the "top" is now open, and the "front" side (that was previously the top in the horizontal orientation) is closed at a lower portion by end wall 206.

In a second configuration as shown in FIG. 4, with a vertical orientation and the end wall 206 in the second position, the convertible container can be used in a transport vehicle, and allows a person to "flip through" the now-vertical items in the container, for sorting, delivery, or other purposes. Further, in specific embodiments, end wall 206 can be partially or wholly transparent, such as being formed of a transparent plastic. In such cases, a mail carrier or other person can view the items through the end wall 206, and can read any address labels or other information on the items.

The container can therefore be used as an output tray of a mail processing machine in the first configuration, changed into the second configuration, and used as a vertical delivery tray in a delivery vehicle in the second configuration.

Disclosed embodiments also include a method to transition a horizontal stack of items in a container to a vertical stack of items for extraction, without the items inside the container being acted upon or transferred to another container. This embodiment includes re-positioning one of the end walls of the container to allow the container to be moved from a horizontal position to a vertical position.

Figure 5:
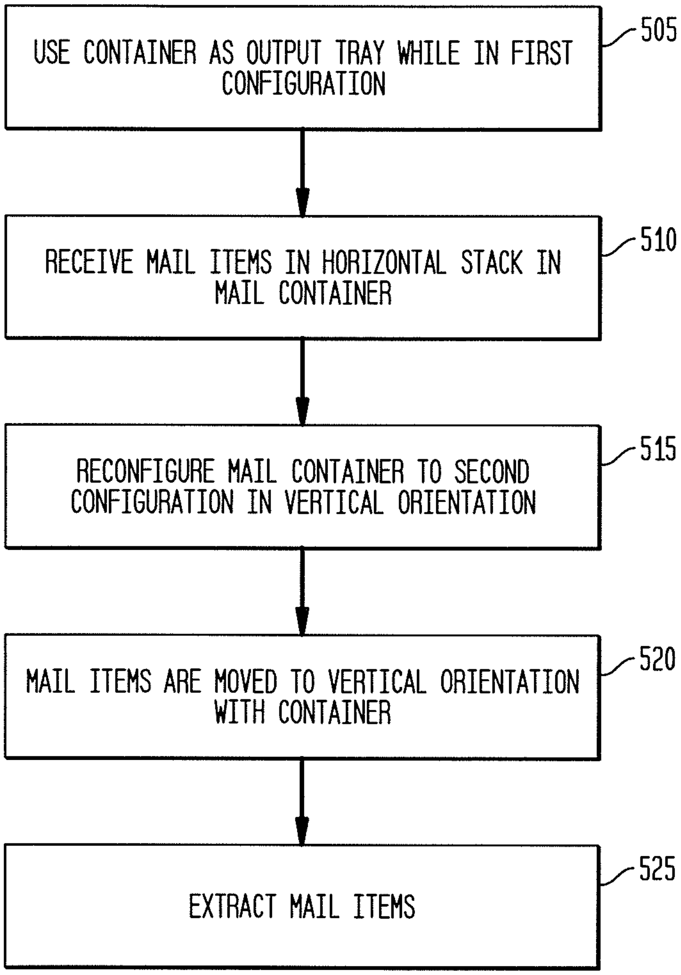
FIG. 5 depicts a flowchart of a process in accordance with disclosed embodiments.

FIG. 5 depicts a flowchart of a process in accordance with disclosed embodiments.

First, a convertible mail container as described herein is used as an output tray of a mail processing machine (step 505). The convertible mail container is in the first configuration as described herein.

A plurality of mail items is received in the convertible mail container in a horizontal stack (step 510).

The convertible mail container is reconfigured to the vertical second configuration as described herein (515). This step can include moving the end wall from the first position to the second position, and moving the convertible mail container to a vertical orientation.

The plurality of mail items are moved to a vertical orientation (step 520). This process can and typically will occur naturally as the convertible mail container is moved to the vertical orientation. The mail items can then be in a sequenced order, as output from the mail processing machine, but now in a more convenient vertical orientation.

The mail items are extracted from the convertible mail container while it is in the second configuration (step 525). This extraction can be done to further process the mail items, to deliver one or more mail items, or can include transporting the convertible mail container in a delivery vehicle while in the second configuration so that the mail items can be selectively extracted for delivery.

In various embodiments, various ones of the steps above may be performed sequentially, concurrently, in a different order, or omitted, unless otherwise specifically claimed. In particular, various steps can be performed at different locations or by different parties using separate or interconnected mail processing systems, and so only specific steps may be performed at a certain time or by a specific party or system.

Those skilled in the art will recognize that, for simplicity and clarity, the foil structure and operation of all systems suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that an particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method of transporting mail items, comprising:

using a convertible mail container in a horizontal configuration as an output tray of a mail processing machine, the convertible mail container having
- a bottom,
- two fixed side walls connected to the bottom,
- a fixed end wall connected to the side walls and to the bottom, and
- a movable wall that is movable from a first position where the movable wall forms a second end wall of the convertible mail container, opposite the fixed end wall, to a second position where the movable wall is adjacent to the two fixed side walls and the fixed end wall so that it covers a portion of a top opening of the convertible mail container, wherein the movable wall the movable wall can rotate about a hinge that is configured to travel in slots in the side walls and acts as a wall of the convertible mail container when the convertible mail container is in a first configuration where the movable wall is in the first position and the convertible mail container is in a horizontal orientation, and also when the convertible mail container is in a second configuration where the movable wall is in the second position and the convertible mail container is in a vertical orientation;

receiving a plurality of items in the convertible mail container in a horizontal stack;

reconfiguring the convertible mail container to a vertical configuration, including moving a wall of the convertible mail container, so that the plurality of items is moved to a vertical orientation; and extracting the plurality of items while the convertible mail container is in the vertical configuration.

2. The method of claim 1, further comprising transporting the convertible mail container in the vertical configuration so the plurality of items can be selectively extracted for delivery.

3. The method of claim 1, wherein the wall of the convertible container is at least partially transparent so that the plurality of mail items can be viewed through the wall.

4. A method of transporting mail items, comprising:

using a convertible mail container in a horizontal configuration as an output tray of a mail processing machine;

receiving a plurality of items in the convertible mail container in a horizontal stack;

reconfiguring the convertible mail container to a vertical configuration, including moving a wall of the convertible mail container, so that the plurality of items is moved to a vertical orientation;

transporting the convertible mail container in the vertical configuration so the plurality of items can be selectively extracted for delivery; and extracting the plurality of items while the convertible mail container is in the vertical configuration.

5. The method of claim 4, wherein the wall of the convertible container is at least partially transparent so that the plurality of mail items can be viewed through the wall.

* * * * *